United States Patent
Rogers et al.

(10) Patent No.: US 10,019,242 B2
(45) Date of Patent: Jul. 10, 2018

(54) USER INTERFACE ENGINE FOR MINIAPP DEVELOPMENT

(71) Applicant: ADP, LLC, Roseland, NJ (US)

(72) Inventors: Thomas Rogers, New York, NY (US); Richard Benjamin Noad, Montclair, NJ (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 15/498,168

(22) Filed: Apr. 26, 2017

(65) Prior Publication Data

US 2017/0315786 A1 Nov. 2, 2017

Related U.S. Application Data

(60) Provisional application No. 62/328,514, filed on Apr. 27, 2016.

(51) Int. Cl.
*G06F 9/44* (2018.01)
*G06F 8/34* (2018.01)
*G06F 8/35* (2018.01)
*G06F 8/38* (2018.01)
*G06F 9/451* (2018.01)

(52) U.S. Cl.
CPC ............... *G06F 8/34* (2013.01); *G06F 8/35* (2013.01); *G06F 8/38* (2013.01); *G06F 9/451* (2018.02)

(58) Field of Classification Search
None
See application file for complete search history.

(56) References Cited

U.S. PATENT DOCUMENTS

| | | |
|---|---|---|
| 5,862,379 A | 1/1999 | Rubin et al. |
| 7,340,715 B2 | 3/2008 | Liu |
| 7,496,888 B2 | 2/2009 | Sanjar et al. |
| 8,291,408 B1 | 10/2012 | Czymontek |
| 8,533,661 B2 | 9/2013 | Nucci et al. |
| 8,635,673 B2 | 1/2014 | Rangachari et al. |
| 9,116,766 B2 | 8/2015 | Mall et al. |
| 2004/0143822 A1 | 7/2004 | Jager et al. |
| 2006/0085448 A1 | 4/2006 | Hsieh et al. |

(Continued)

OTHER PUBLICATIONS

"ScriptKit: Your mobile scratchpad," BuzaMoto, LLC, copyright 2012-2017, 3 pages.

(Continued)

*Primary Examiner* — Chuck Kendall
(74) *Attorney, Agent, or Firm* — Yee & Associates, P.C.

(57) ABSTRACT

A method of generating a user interface. A user interface of tiles is displayed, the tiles represent building blocks. A tangible input device is used to manipulate the building blocks in the user interface by combining a first building block and a second building block. Metadata describing the first building block and the second building block is retrieved. A database is queried to retrieve data indicated by the metadata as being needed to build an application. The data is bound to the browser page. Rules are generated, the rules needed to create, using the data, the application from a combination of the first building block and the second building block. Code useable to execute the rules is obtained and the code is loaded into the browser. The code is combined into the application, wherein the user does not provide the code.

20 Claims, 10 Drawing Sheets

(56) References Cited

U.S. PATENT DOCUMENTS

2007/0220035 A1 9/2007 Misovski
2016/0364398 A1* 12/2016 Nelson ................ G06F 17/3089

OTHER PUBLICATIONS

"Visual programming language," Wikipedia, the free encyclopedia, Mar. 2, 2004 (updated Apr. 26, 2017), 6 pages. https://en.wikipedia.org/wiki/Visual_programming_language.

"Webflow Features," Webflow, Inc., copyright 2013-2017, 10 pages. http://webflow.com/features.

* cited by examiner

USER INTERFACE ENGINE FOR MINIAPP DEVELOPMENT

CROSS-REFERENCE TO RELATED APPLICATION(S)

This application claims the benefit of priority to U.S. Provisional Patent Application No. 62/328,514, filed Apr. 27, 2016, titled "User Interface Engine for Miniapp Development."

BACKGROUND INFORMATION

1. Field

The present disclosure relates to methods and devices for creating special purpose computers whose hardware and programming enable transformation of a user interface and transformation of the function of a computer such that an untrained user may develop applications.

2. Background

Currently, when a new computer program is desired, a trained programmer uses one or more specialized computer languages to create code. Code instructs a computer to perform a desired function.

In most cases, even for simple programs, the programmer must have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and for some individuals beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

SUMMARY

The illustrative embodiments provide for a method of transforming a computer by changing a function of the computer without a user providing the computer with computer code. The method includes displaying, on a display device in communication with the computer, a user interface comprising tiles, wherein the tiles represent building blocks, each building block of the building blocks comprising a distinct, atomic unit of functionality executable by the computer. The method also includes manipulating, using a tangible input device in communication with the computer, the building blocks in the user interface, wherein manipulating includes combining in the user interface a first building block and a second building block in the building blocks. The method also includes retrieving, by the computer, metadata describing the first building block and the second building block, wherein the metadata also describes a layout, that is unique to the computer, for a browser page. The method also includes querying, by the computer, a database to retrieve data indicated by the metadata as being needed to build an application executable by the computer. The method also includes binding, by the computer, the data to the browser page. The method also includes generating, by the computer, rules needed to create, using the data, the application from a combination of the first building block and the second building block. The method also includes obtaining, by the computer, code useable to execute the rules and loading the code into the browser. The method also includes combining, by the computer, the code into the application, wherein the user does not provide the code.

The illustrative embodiments also provide for a non-transitory computer readable medium storing program code which, when executed by a processor, performs a computer implemented method of transforming a computer by changing a function of the computer without a user providing the computer with computer code. The program code includes computer usable program code for displaying, on a display device in communication with the computer, a user interface comprising tiles, wherein the tiles represent building blocks, each building block of the building blocks comprising a distinct, atomic unit of functionality executable by the computer. The program code also includes computer usable program code for manipulating, using a tangible input device in communication with the computer, the building blocks in the user interface, wherein manipulating includes combining in the user interface a first building block and a second building block in the building blocks. The program code also includes computer usable program code for retrieving, by the computer, metadata describing the first building block and the second building block, wherein the metadata also describes a layout, that is unique to the computer, for a browser page. The program code also includes computer usable program code for querying, by the computer, a database to retrieve data indicated by the metadata as being needed to build an application executable by the computer. The program code also includes computer usable program code for binding, by the computer, the data to the browser page. The program code also includes computer usable program code for generating, by the computer, rules needed to create, using the data, the application from a combination of the first building block and the second building block. The program code also includes computer usable program code for obtaining, by the computer, code useable to execute the rules and loading the code into the browser. The program code also includes computer usable program code for combining, by the computer, the code into the application, wherein the user does not provide the code.

The illustrative embodiments also provide for a method of transforming a user interface. The method includes displaying, on a display device in communication with the computer, a user interface comprising tiles, wherein the tiles represent building blocks, each building block of the building blocks comprising a distinct, atomic unit of functionality executable by the computer. The method also includes manipulating, using a tangible input device in communication with the computer, the building blocks in the user interface, wherein manipulating includes combining in the user interface a first building block and a second building block in the building blocks. The method also includes retrieving, by the processor, metadata describing the first building block and the second building block, wherein the metadata also describes a layout, that is unique to the computer, for a browser page. The method also includes querying, by the processor, a database to retrieve data indicated by the metadata as being needed to build an application executable by the processor. The method also includes binding, by the processor, the data to the browser page. The method also includes generating, by the processor, rules needed to create, using the data, the application from a combination of the first building block and the second building block. The method also includes obtaining, by the processor, code useable to execute the rules and loading the code into the browser. The method also includes combining, by the processor, the code into the application, wherein the user does not provide the code. The method also includes displaying the application on the user interface as a new tile.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that it is desirable to have a user interface engine to orchestrate development of mini apps within an enterprise development environment. User interface atomic components are the basis for mini app development. The user interface engine architecture allows for rapid creation of user interface atomic components and allows for codeless integration with responsive and adaptive mobile and touch support.

The illustrative embodiments also recognize and take into account that binding of customer data to a user browser in a way that makes sense for all different developer uses cases is a difficult and previously unsolved problem. Complicating this problem is the interaction of server side resources with the interface components in the browser that the user manipulates, as well as with business rules specified by a user. Thus, the illustrative embodiments recognize and take into account that while a user may perceive a codeless, seamless, and integrated application development experience, the underlying functionality of the user interface engine is highly complex in order to enable that user experience.

Figure 1:
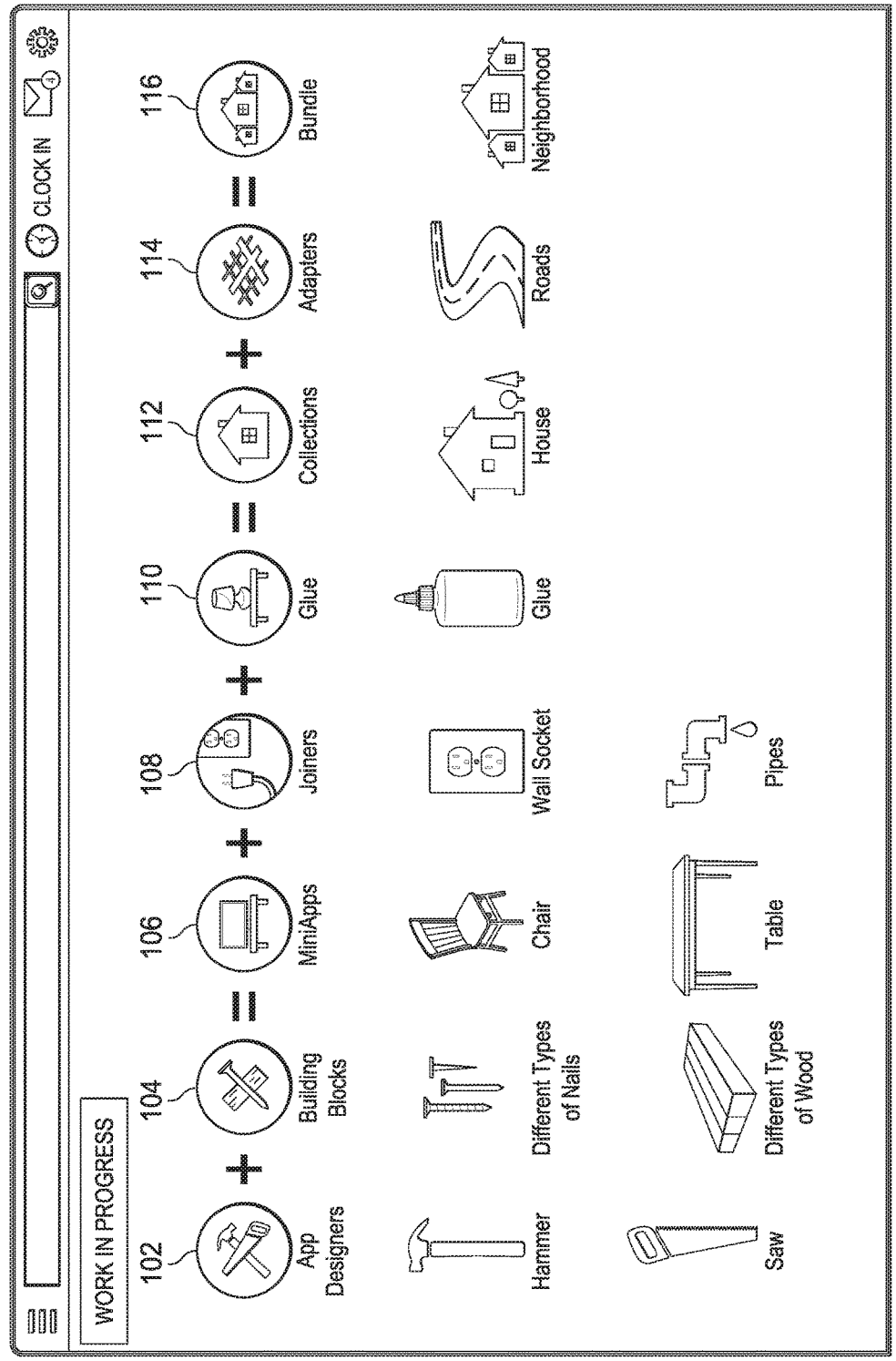
FIG. 1 is a graphical representation of terms used in this document, in accordance with an illustrative embodiment.

FIG. 1 is a graphical representation of terms used in this document, in accordance with an illustrative embodiment. Graphical representation 100 contains a number of terms used throughout this document. Definitions of terms described here apply throughout this document. Graphical representation 100 also shows the relationships among the various terms used herein, as well as pictorial representations which, by analogy only, aid in understanding the functionality of a given term.

As defined herein, an "app designer", represented by icon 102, refers to one or more tools displayed on a user interface which users may manipulate to develop applications. An application or applications may also be known as an "app" or "apps". For purposes of the illustrative embodiments described herein, the term "app designers" relates to codeless development tools for combining building blocks together to create, test, and use miniapps, described further below. By analogy to home building, an app designer is analogous to a tool used in home building, such as a hammer or a saw.

As defined herein, a "building block", represented by icon 104, is defined as a distinct, atomic unit of functionality executable by the computer to perform a function. Multiple building blocks combined together can form miniapps or apps. In other words, app designers may be used to create "building blocks", represented by icon 104. By analogy to home building, building blocks are analogous to different types of nails, different types of wood, or other components used in the building of a home. By analogy to toys, "building blocks" could be akin to LEGOS®.

As defined herein, a "miniapp" is a small, or simple, application built using two or more building blocks, represented by icon 106. Miniapps typically provide a computer with only one or a few functions. As an exception, in some cases a miniapp may be formed by a single building block, a single building block miniapp would have to have at least joiners or glue, as described below, to be used in conjunction with other miniapps or other software. By analogy to home building, a miniapp is an object used in a house, such as a chair, a table, a light fixture, an appliance, etc. Thus, miniapps are small, discrete, user-facing applications built using building blocks. Miniapps may be designed to deliver additional value to end users.

As defined herein, a "joiner", represented by icon 108, is computer code that when executed creates user-facing functionality that a miniapp leverages. Joiners can share data and functionality from SORs owned by other miniapps. By analogy to home building, a joiner is a device in a home that connects functionality in the home, such as a wall socket, pipes, electrical wiring, etc. Thus, joiners may be used to create a unified user experience across multiple miniapps.

As defined herein, "glue", represented by icon 110, is computer code that one miniapp can borrow from another to create a common function between two miniapps. Thus, "glue" is code which can be used to combine miniapps together. "Glue" could be, for example, workflows, application programming interfaces, or tiles. By analogy to home building, "glue" is a device that connects objects together, such as an adhesive. Thus, for example, glue may be considered workflows or tiles that one miniapp can borrow from another to create a better user experience between the two miniapps.

As defined herein, a "collection", represented by icon 112, is a group of miniapps, possibly joined and glued, that may meet the desires of a specific user or group of users. By analogy to home building, a collection could be a house and the useful objects within it. Thus, a "collection" could be a set of miniapps, some of which are possibly glued and joined, that accomplish a specific goal. For example a business could have a "collection" that is used in administering employee payroll and management.

As defined herein, an "adapter", represented by icon 114, is computer code which provides functionality for integrating with external systems that were not built using adapters. By analogy to home building, an adapter could be considered a "road" which connects the users "home" to other buildings in a neighborhood or city. As an example, an adapter could be computer code which allows a building block, a miniapp, or a collection to interact with or use other types of software produced by different third party entities. As a specific example, an adapter could provide functionality that allows the employee payroll and management collection described above to interact with a third party word processor or accounting software.

As defined herein, a "bundle", represented by icon 116, is a group of collections that has been extended through adapters to create an integrated. Possibly a bundle is a software product that could be sold to one or more clients. By analogy to home building, a bundle could be considered a neighborhood.

As defined herein, a "user interface engine" is computer code and underlying data and metadata which provide underlying functionality and implementation capability for app designers. At this point, the home building analogy is not precise, but vaguely speaking a user interface engine is the materials and that compose the tools that are used to manipulate building blocks and to create miniapps, joiners, glue, collections, adapters, and bundles, as well as possibly devices that are used to create the tools themselves. Implementation details of the user interface engine are described further below.

Figure 2:
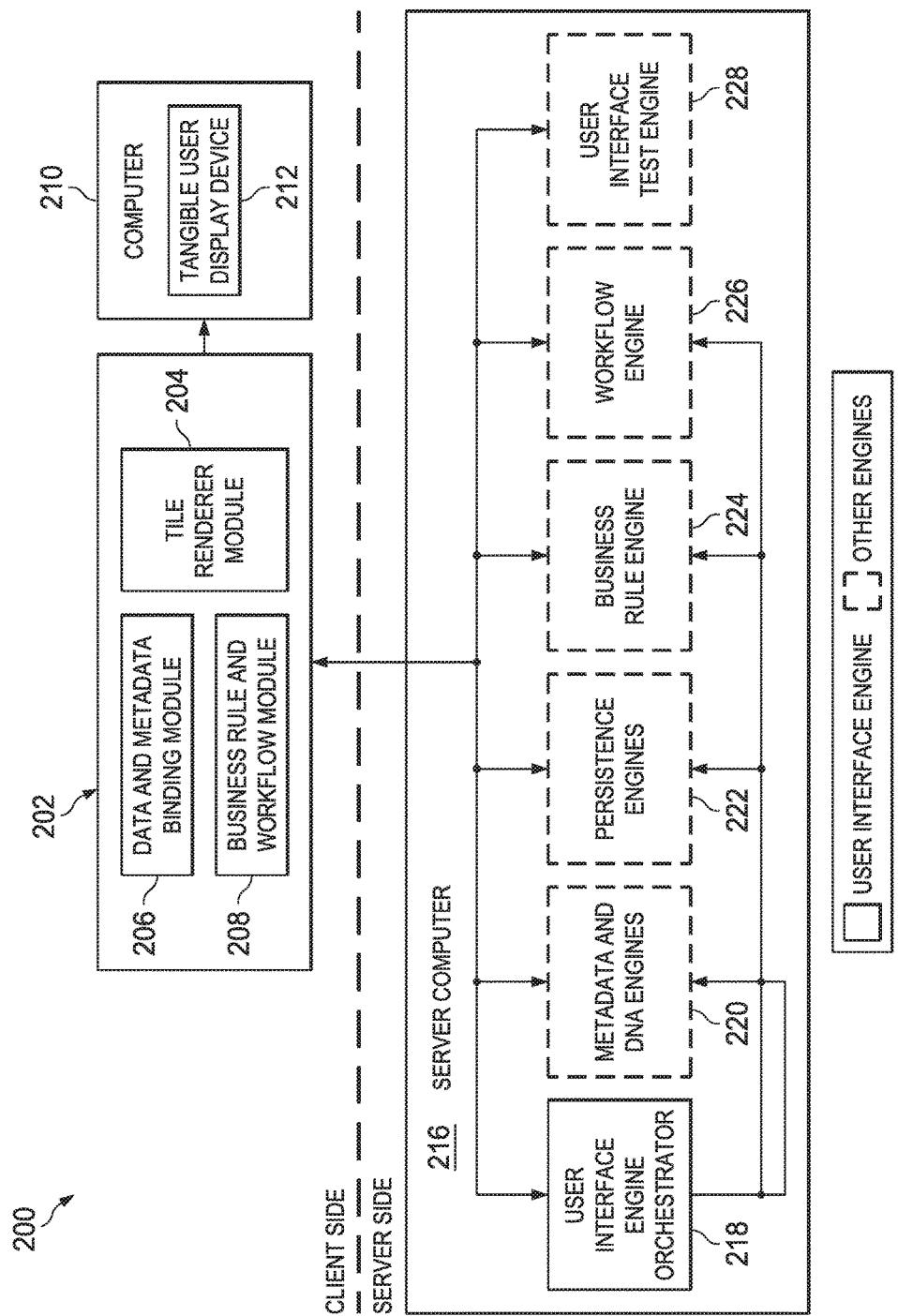
FIG. 2 is a block diagram illustrating a user interface engine in the context of a larger application development system, in accordance with an illustrative embodiment.

FIG. 2 is a block diagram illustrating a user interface engine in the context of a larger application development system, in accordance with an illustrative embodiment. Application development system 200, including user interface engine 202, may be used to manipulate app designers, building blocks, joiners, glue, and adapters to build miniapps, collections, and bundles, all as described with respect to FIG. 1. Thus, user interface engine 202 may be considered an example of the user interface engine described with respect to FIG. 1.

From a software architecture viewpoint, user interface engine 202 is a client-side application. User interface engine 202 may be part of a Web browser, allowing for a user friendly interface experience.

Underlying the user interface, user interface engine 202 may include three modules: tile renderer module 204, data and metadata binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from data and metadata binding module 206, and from business rule and workflow module 208 to change and manipulate both the functionality of computer 210 which is used to execute tile renderer module 204, as well as tangible user display device 212, which is used to display rendered tiles.

Data and metadata binding module 206 is computer code which computer 210 may use to bind data and metadata to the user interface, possibly a browser, so that user interface engine 202 may keep track of all of the data and metadata used in executing business rules and workflows, as well as rendering tiles. Additional details regarding the functionality of data and metadata binding module 206 is described below with respect to how data and metadata are used in user interface engine 202.

Business rule and workflow module 208 is computer code which computer 210 may use to create, join, merge, or otherwise manipulate business rules and workflows together in order to create miniapps, collections, and bundles. The user typically does not see the operations of business rule and workflow module 208, as one of the advantages of the illustrative embodiments is to create a codeless development environment from the perspective of the user. Thus, business rule and workflow module business rule and workflow module 208, using data and metadata tracked by data and metadata binding module 206, is the underlying code which allows a user to manipulate tiles rendered by tile renderer module 204 and thereby create miniapps, collections, and bundles without the user having to code any of the software being developed. Business rule and workflow module 208 may use building blocks, joiners, glue, and adapters together with work flows and business rules to create the miniapps, collections, or bundles. Additional details regarding business rule and workflow module 208 are described below.

Primarily, user interface engine 202 operates client-side, meaning that user interface engine 202 operates on a specific client user's computer. Thus, for example, computer 210 could be a specific user's computer. In this case, user interface engine 202 could be a Web browser or an extension to a Web browser that allows a user to build miniapps, collections, and bundles.

However, in some illustrative embodiments, user interface engine 202 may also take advantage of some server side services 214 operating on one or more server computers, such as server computer 216. "Server side" means that computer 210 communicates with server computer 216, possibly over a network such as the Internet. Usually server side resources are provided by the developer of user interface engine 202 in order to support the user of user interface engine 202. While not always necessary for implementation of user interface engine 202, server side resources can enhance the functionality of user interface engine 202.

For example, the server side resources may include user interface orchestrator 218. In some exemplary illustrative embodiments, user interface orchestrator 218 may be considered part of user interface engine 202 such that user interface engine 202 operates partially both on computer 210, but also on one or more server computers, such as server computer 216.

User interface orchestrator 218 may serve as a proxy to speed up processing of user interface engine 202. User interface orchestrator 218 may retrieve metadata and then identify whether data queries are for customer data, business rules, or any other metadata objects. User interface orchestrator 218 may then request such data, objects, or code, from the data center operating server side. User interface orchestrator 218 may cache retrieved data, metadata, code, workflows, or objects to be sent back to user interface engine 202.

Server side services may include other components other than user interface orchestrator 218. For example, server side resources could include one or more metadata and DNA engines 220, which can be used to manage or provide metadata for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of miniapps, collections, and bundles. Server side resources may also include workflow engine 226, which may be used to create or store workflows that are used by user interface engine 202 in the user-perceived codeless building of miniapps, collections, and bundles. Server side resources may also include user interface test engine 228, which may be used to test both the functionality of user interface engine 202, possibly as well as the miniapps, collections, and bundles created using user interface engine 202.

The illustrative embodiments may be varied and are not necessarily limited by the examples described with respect to FIG. 2. For example, other server side resources could be provided, such as for example a database of pre-prepared commonly used miniapps, collections, or bundles. In another example, user interface engine 202 may include other modules, such as an interface module that allows user interface engine 202 to interface with other new or existing software installed on computer 210. Other examples are possible.

Thus, computer 210 provides an architecture that allows rapid creation of user interface miniapps, collections, bundles, and possibly even building blocks. The user interface may be high performance at 30-60 frames per second delta based rendering, possibly re-rendering tiles on every change. The illustrative embodiments may provide for in-data center orchestration and rendering for accelerated page loading. The illustrative embodiments may be responsive and adaptive with touch screen support. The illustrative embodiments may also communicate and use existing third party software. Thus, the illustrative embodiments enable the user to rapidly develop miniapps, collections, and bundles and possibly building blocks without the user supplying computer code. The illustrative embodiments may use REACT® as a JAVASCRIPT® library to create the user interface. The illustrative embodiments may use ANGULAR® to integrate with REACT® so that ANGULAR® services may be wrapped in plain JAVASCRIPT®, exposing them with REACT® views. ANGULAR® directives can be rendered within REACT® views via $compile. State management may be accomplished by leveraging a FLUX® one-way binding pattern for actions and state.

Attention is now turned to other details of user interface engine 202 in the context of application development system 200. As indicated above, the purpose of user interface engine 202 is to orchestrate development of miniapps, collections, and bundles within an enterprise development environment. Building blocks may be the basis for miniapp development. User interface engine 202 has an architecture that allows for rapid creation of user interface building blocks, and allows for user-perceived codeless integration with responsive and adaptive mobile and touch support.

An aspect of the user interface engine is that it may connect client data to pages. This aspect allows the capability to push real time updates to the browser or user interface. In this manner, multiple users may work on same data sets to see live data changes.

The user interface engine may be metadata driven. The user interface engine may loads metadata for a page displayed in a browser, and then run queries against local or remote databases to get data. For example, the user interface engine may load metadata for a page and then run a query against a remote database to get customer data used for constructing miniapps. The metadata may describe the page and page layout. The user interface engine may query customer data to get employee information, for example.

The user interface engine may provide a tool for executing business logic. From the metadata description of an overall Web page of the user interface, the user interface engine may list what business rules are applicable and also list the input data. The user interface engine may then retrieve code for those business rules, stored either locally or on a remote server. The user interface engine may take the code, brings it into the browser, and stitch all inputs into business rules. Finally, the user interface engine may execute the rules display the results.

The user interface engine may keep track of all of inputs for running queries. In this manner, if one of those inputs changes via user interaction or updated data, then the user interface engine can push updates out to the browser. The user interface engine may detect changes to the miniapp and then re-execute the code needed to build the miniapp.

Although the user interface engine primarily operates client side, as described above the user interface engine may take advantage of server side resources. Also as indicated above, the user interface engine may be implemented in a Web browser to facilitate access to remote services. For example, a user may type a uniform resource link (URL) of a resource. The user interface engine may recognize the URL as an identification for metadata that is to be retrieved. The user interface engine may take the identification and retrieve the metadata or underlying data. Parameters in the URL can modify what is retrieved or the conditions under which it is retrieved. Retrieved metadata objects may be processed by the user interface engine.

Also on the subject of server side resources, attention is again turned to user interface orchestrator 218. User interface orchestrator 218 may be a proxy to speed up processing. User interface orchestrator 218 may receive metadata, identify data queries for customer data, business rules, and any other metadata objects, and then request all of those from the data center that is operated server side. User interface orchestrator 218 may cache these objects to be sent back to the browser client side. In some cases, code may be executed server side and the results returned to the client to speed up client processing.

In an illustrative embodiment, the user interface engine may first load metadata. A metadata shim transforms and registers with query store, keeping track of parameters. The metadata may take the form of JSON (JavaScript Object Notation) objects, though metadata may be composed of multiple data models. The user interface engine may construct application programming interface (API) calls out to the server side data services to retrieve customer data. Each query in the construct may have input parameters and may immediately take note of the parameters that are to be fed into each query.

The user interface engine may also collect and keep track of business rules and inputs to business rules. The user interface engine may also consume business rules. Typically the user interface engine is not used to create business rules, but rather manipulates existing business rules in the creation of miniapps.

An issue overcome by the user interface engine of the illustrative embodiments is that different users may have different requirements for how the user interface engine operates. The user interface engine may use metadata to put in the fields of each user for each element. Thus, the illustrative embodiments provide a user interface engine that may be configured to the needs and desires of each individual user.

Another issue overcome by the user interface engine of the illustrative embodiments is, from the perspective of the user, codeless programming. The user interface engine of the illustrative embodiments may take programming of if-then statement out of the design of miniapps, collections, and bundles. The user interface engine may perform interpretation of the metadata and business rules, and then present an interface customized for each user.

Another issue overcome by the user interface engine of the illustrative embodiments is binding of customer data to a browser page in a way that makes sense for all of the different use cases that developers want, and then provide seamless interaction between different users. The illustrative embodiments provide for support of the various building blocks shown on the page and provides for handling interaction effects between building blocks and business rules.

In an illustrative embodiment, the user interface engine may address the above issues by keeping track of all input parameters. A state of a given user interface engine is stored in a tree structure which includes different parameters and metadata objects. The tree structure also stores the data queries by using virtual pointers to the underlying data. The user interface engine then binds queries to the user interface engine components. This tree structure provides for flexibility to handle changes and to keep track of saved parameters.

Additionally, the user interface engine may maintain a dependency graph of input parameters that may come from an input URL, or data user, or retrieved data. These parameters may be inserted into queries that are then executed and retrieved from the application programming interfaces. Information from the dependency graph may also be fed into business rules.

Data that comes back form application programming interface calls may be tracked, as well as the views of the data. This aspect of the user interface engine makes pagination easier because a layer exists to manage dependencies. What a user sees on the screen need not be the entire data set, but may be only a display of the data points that correspond to that page. If a user clicks to go to the next page, data already in the browser is displayed, but could be fetched from the server if needed. If have different parts with the same data are present, the user interface engine does not have to fetch them twice.

Figure 3:
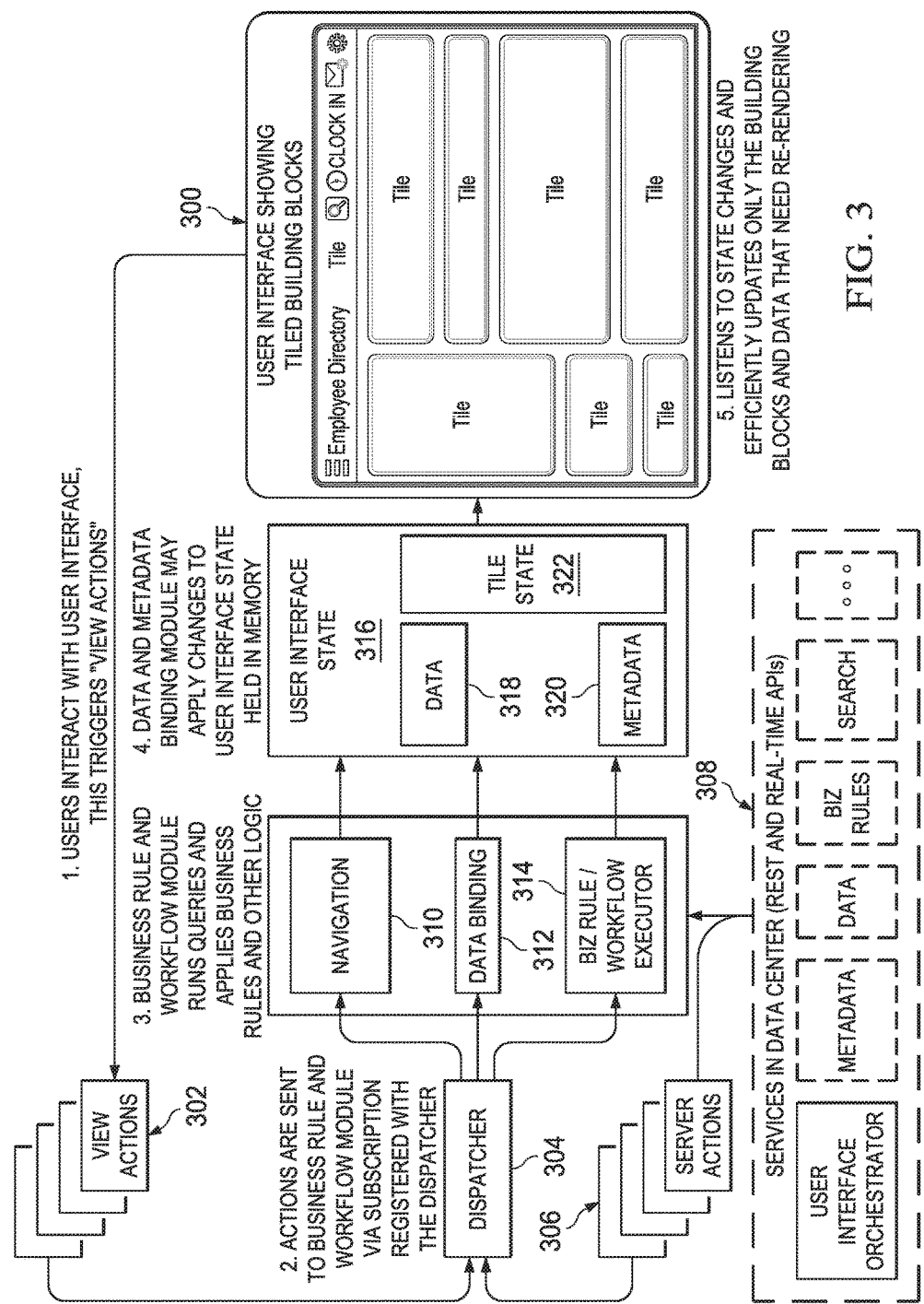
FIG. 3 is a block diagram illustrating an example of an operation of the user interface engine show in FIG. 2, in accordance with an illustrative embodiment.

FIG. 3 is a block diagram illustrating an example of an operation of the user interface engine show in FIG. 2, in accordance with an illustrative embodiment. The example shown in FIG. 3 does not necessarily limit operation of user interface engine 202 shown in FIG. 2. Nevertheless, FIG. 4 may be read in conjunction with FIG. 2.

In an illustrative embodiment, tile renderer module 204 may be used to generate user interface 300. User interface 300 may take the form of tiles shown in a Web browser. Each tile may represent a building block. Alternatively, a tile may represent a miniapp, collection, or even a bundle. As a first step, shown as number 1 in FIG. 3, users may interact with user interface 300. Doing so may, for example, trigger a "view actions" command, as shown at icon 302.

These actions are sent to dispatcher 304, which may be part of the user interface engine (not shown in FIG. 2). Dispatcher 304 may send the actions to the business rule and workflow module via subscriptions registered with dispatcher 304. This operation is shown by the number 2 in FIG. 3. Dispatcher 304 may also send server actions 306 sent by data center 308 to the business rule and workflow module for use in combination with the actions started by the user.

The business rule and workflow module may run queries and apply business rules and other logic, as shown by number 3 in FIG. 3. The business rule and workflow module may provide navigation 310, data binding 312, and execution 314 for executing business rules and workflows.

The data and metadata binding module may apply changes to the user interface state held in memory, as shown at number 4 in FIG. 3. The user interface state 316 may be held in a tree structure containing data 318, metadata 320, and tile state 322. In turn, the tile renderer module may render user interface 300. The tile renderer may listen to state changes in the tree structure and efficiently updates only the building blocks and data that need re-rendering, as shown at number 5 in FIG. 3.

Figure 4:
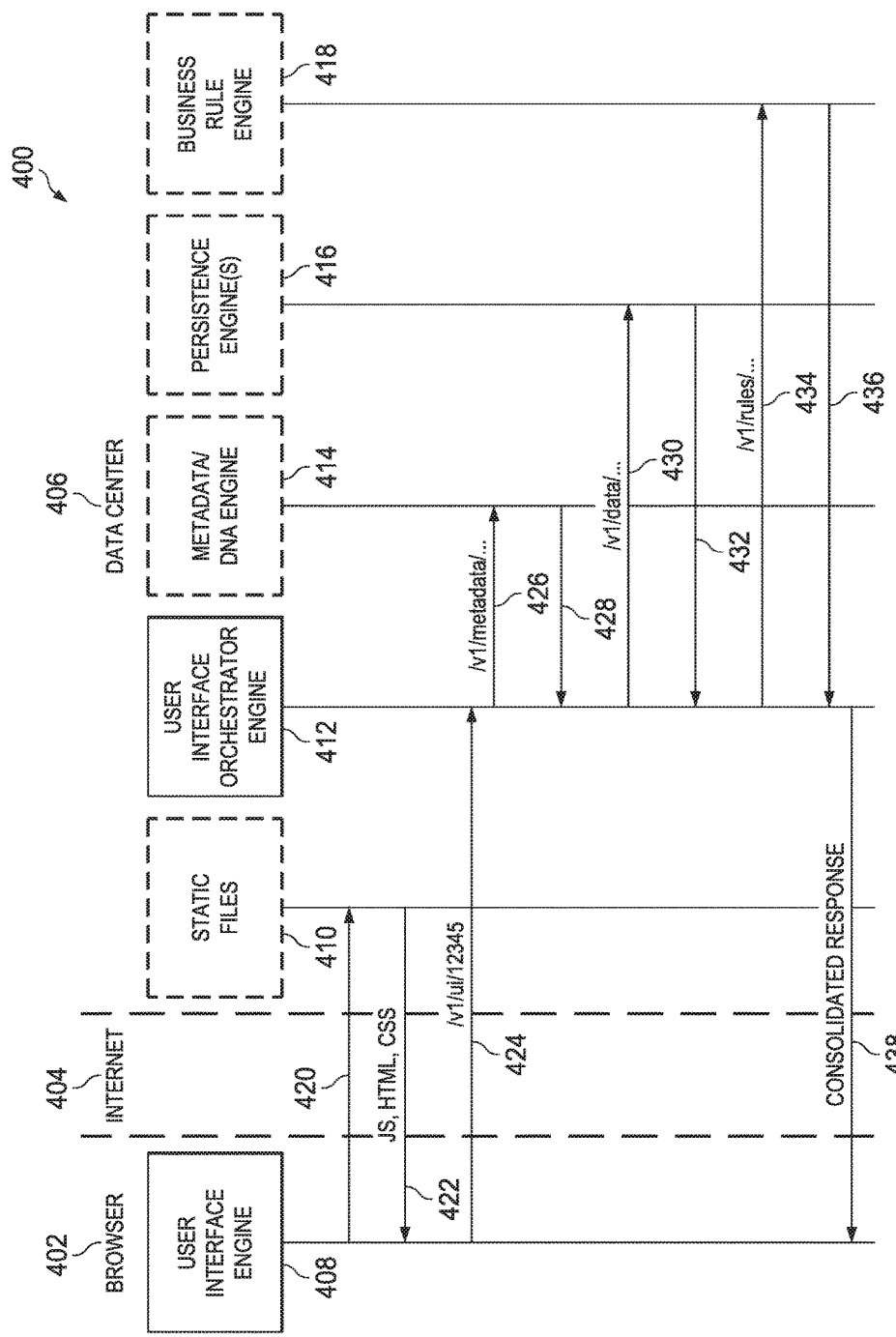
FIG. 4 is a flow diagram showing how a user interface engine may communicate with server side resources to create applications as instructed by a user, in accordance with an illustrative embodiment.

FIG. 4 is a flow diagram showing how a user interface engine may communicate with server side resources to create applications as instructed by a user, in accordance with an illustrative embodiment. FIG. 4 may be read in conjunction with FIG. 2.

In the example of flow 400 shown in FIG. 4, three stages are shown, browser stage 402, Internet stage 404, and data center stage 406. Browser stage 402 may be implemented on a computer, such as computer 210 and may include user interface engine 408. Internet stage 404 may be one or more networked computers that allow browser stage 402 to communicate with data center stage 406. In turn, data center stage 406 may include static files 410, user interface engine orchestrator 412 (which may be user interface orchestrator 218 of FIG. 2), metadata/DNA engine 414, persistence engine 416, and business rule engine 418.

In an illustrative embodiment, user interface engine 408 sends a request to static files 410, as shown by arrow 420. In turn, data center stage 406 returns from static files 410 a file, as shown by arrow 422.

The user interface engine 408 may then send a request for data via a URL to user interface engine orchestrator 412, as shown by arrow 424. In turn, user interface engine orchestrator 412 may send a request for metadata to metadata/DNA engine 414, as shown by arrow 426, which returns the desired data, as shown by arrow 428. The user interface engine orchestrator 412 may also send a request for data to persistence engine 416, as shown by arrow 430. In turn, persistence engine 416 may send the desired data back to user interface engine orchestrator 412, as shown by arrow 432. Additionally, user interface engine orchestrator 412 may also send a request for data to business rule engine 418, as shown by arrow 434. In response, business rule engine 418 may return data to user interface engine orchestrator 412, as shown by arrow 436.

Finally, user interface engine orchestrator 412 may send a consolidated response including all desired data and metadata back to user interface engine 408, as shown by arrow 438. In this manner, the orchestration aspect of user interface engine orchestrator 412 is demonstrated.

FIG. 4 is a specific example, and thus refers to a "browser" and the "Internet". However, the illustrative embodiments are not constrained by these examples. Other networks and user interface tools may be used.

Figure 5:
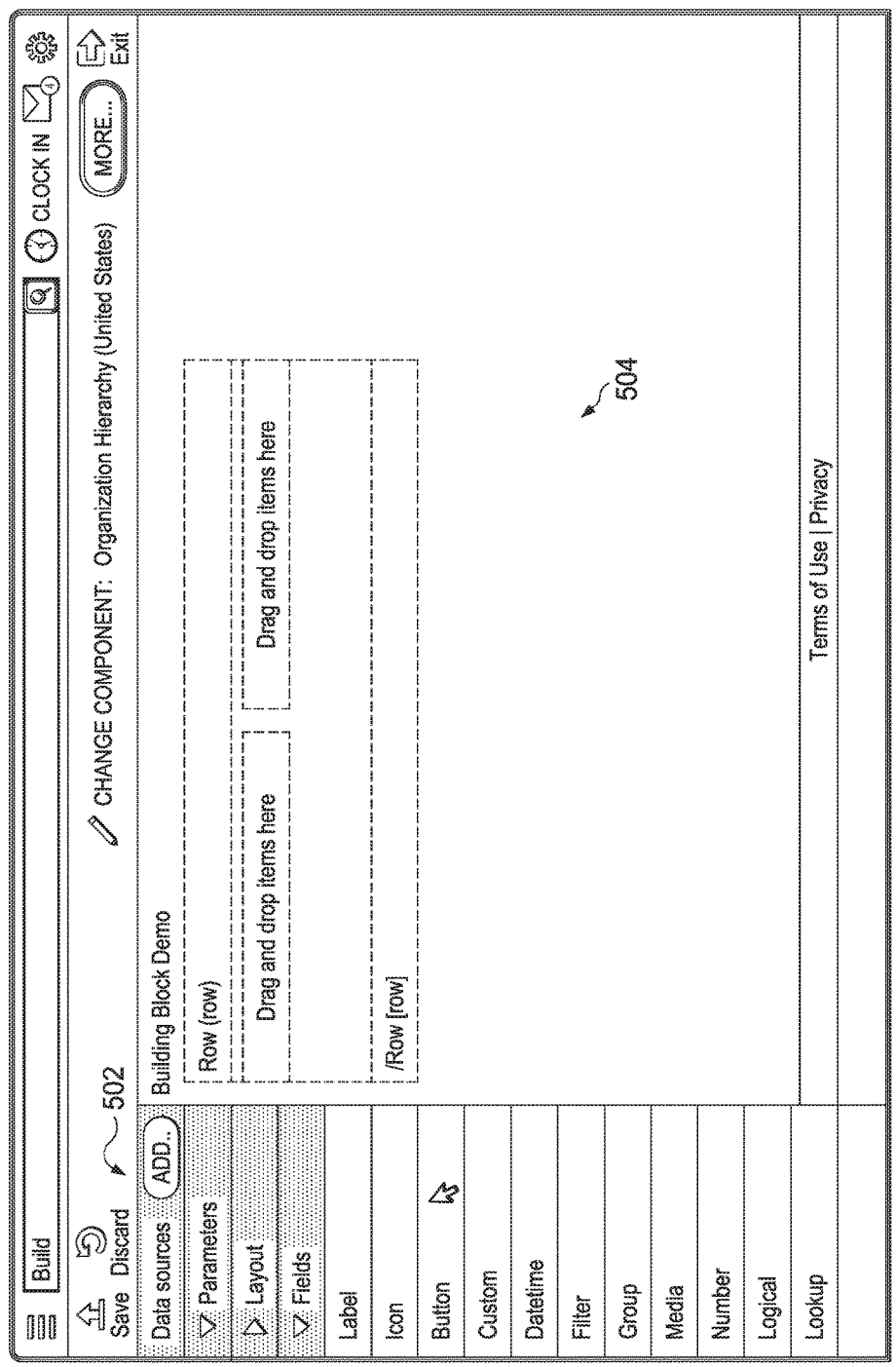
FIG. 5 is an example user interface, in accordance with an illustrative embodiment.
Figure 6:
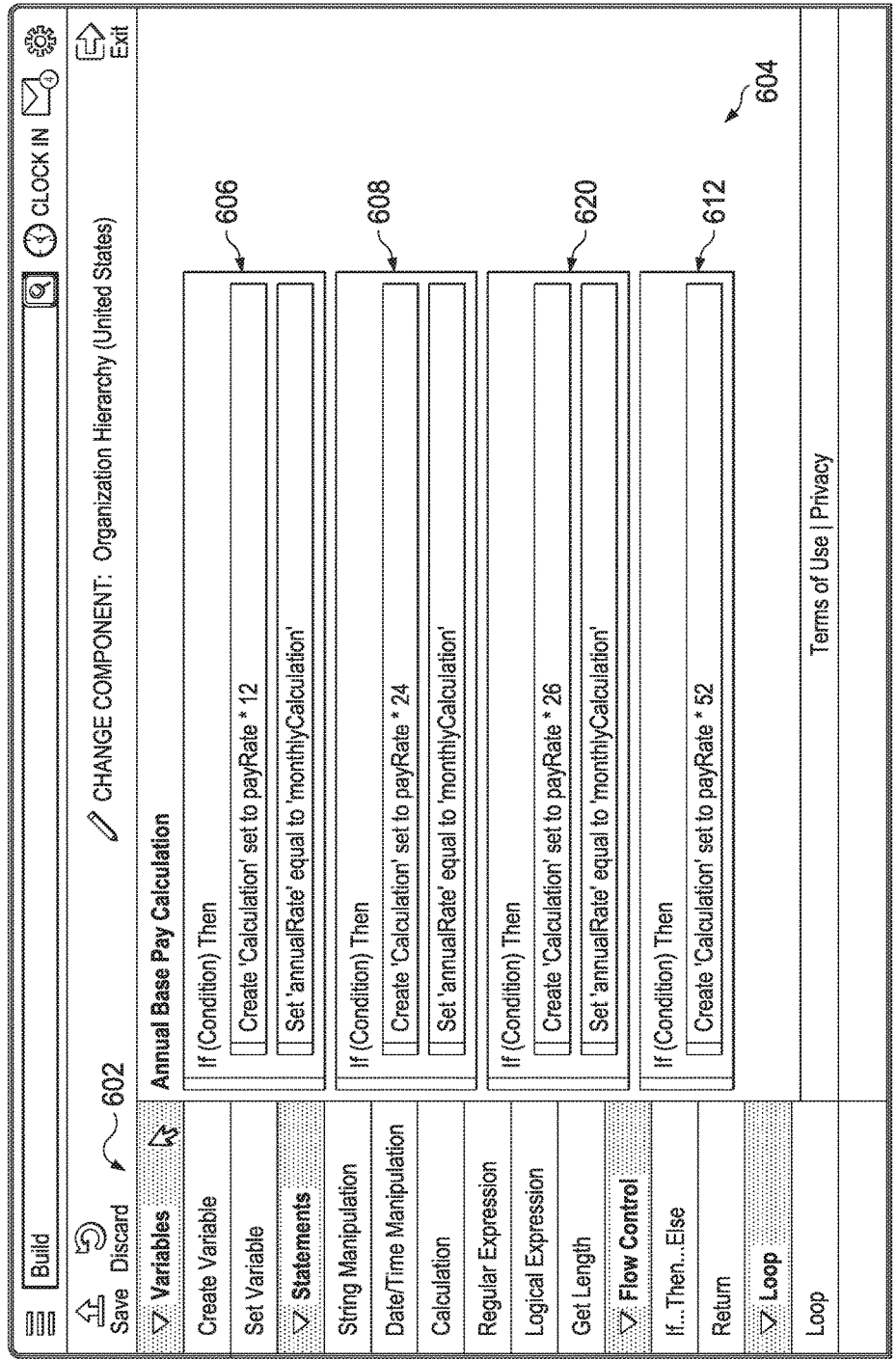
FIG. 6 is an example user interface, in accordance with an illustrative embodiment.
Figure 7:
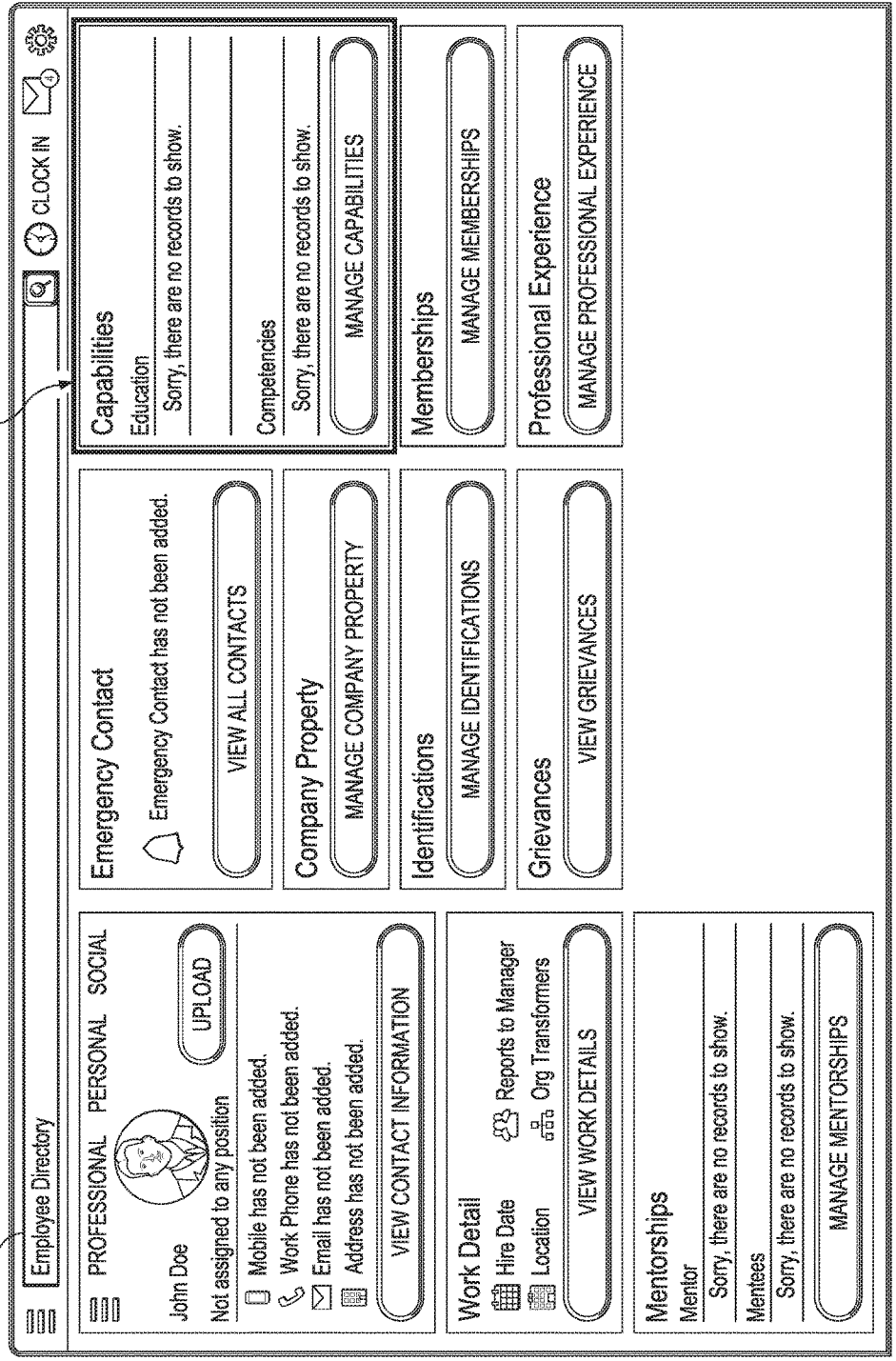
FIG. 7 is an example user interface, in accordance with an illustrative embodiment.

FIG. 5, FIG. 6, and FIG. 7 are examples of user interfaces, in accordance with an illustrative embodiment. These user interfaces may displayed to a user via commands provided by a user interface engine, such as user interface engine 202 shown in FIG. 2. FIG. 5, FIG. 6, and FIG. 7 should be viewed together.

FIG. 5 shows a user interface 500, which is to be displayed to a user who wants to build a miniapp using one or more building blocks. Note that FIG. 5 shows that a user may drag and drop one or more commands or objects from resource bar 502 into tile screen 504. In this manner, the user may begin creating a miniapp without actually programming the code necessary to create the miniapp.

FIG. 6 shows a later stage of miniapp development relative to FIG. 6. Thus, user interface 600 may be user interface 500 at a later time. In this example, various statements from resource bar 602 were dragged into tiles screen 604 in order to create a miniapp that calculates annual base pay for an employee. Each if-then condition statement, such as statement 606, statement 608, statement 608, or statement 610, may represent a single building block. The user interface engine of the illustrative embodiments may combine these statements into a single miniapp which will calculate annual base pay depending on which payment method applies to a given employee. A user would provide the basic data needed to run the miniapp, once the miniapp is finalized.

The user interface engine provides all of the glue and joiners necessary to allow all of the building blocks to function as a single miniapp. Thus, from the user's perspective, the development of the miniapp is codeless. The user interface engine provides all of the code needed to build and then run the miniapp.

The user interface engine may also be used to create collections. For example, FIG. 7 shows user interface 700 which displays a collection of miniapps. Each tile shown in FIG. 7 may be a distinct miniapp which retrieves information for a particular employee; who is John Doe in this example. For example, "capabilities" miniapp 702 could be a miniapp which retrieves information relating to John Doe that relate to his education and competencies, and then displays that information. A button is provided to manage those capabilities by updating new capabilities as time progresses. A new employee with different information shown in each of the tiles may be called up by searching for a different employee in search bar 704.

Thus, FIGS. 5-7 provide specific examples of the use of a user interface engine, such as user interface engine 202 of FIG. 2. However, many other examples of the use of the user interface engine are possible, as many different types of applications are possible. Additionally, a collection such as that shown in FIG. 7 could be added to other collections to create a bundle. For example, a suite of miniapps and collections may be provided to manage an entire business, from accounting to human resources to business planning, and more. Accordingly, the examples shown in FIGS. 5-7 are not necessarily limiting.

Figure 8:
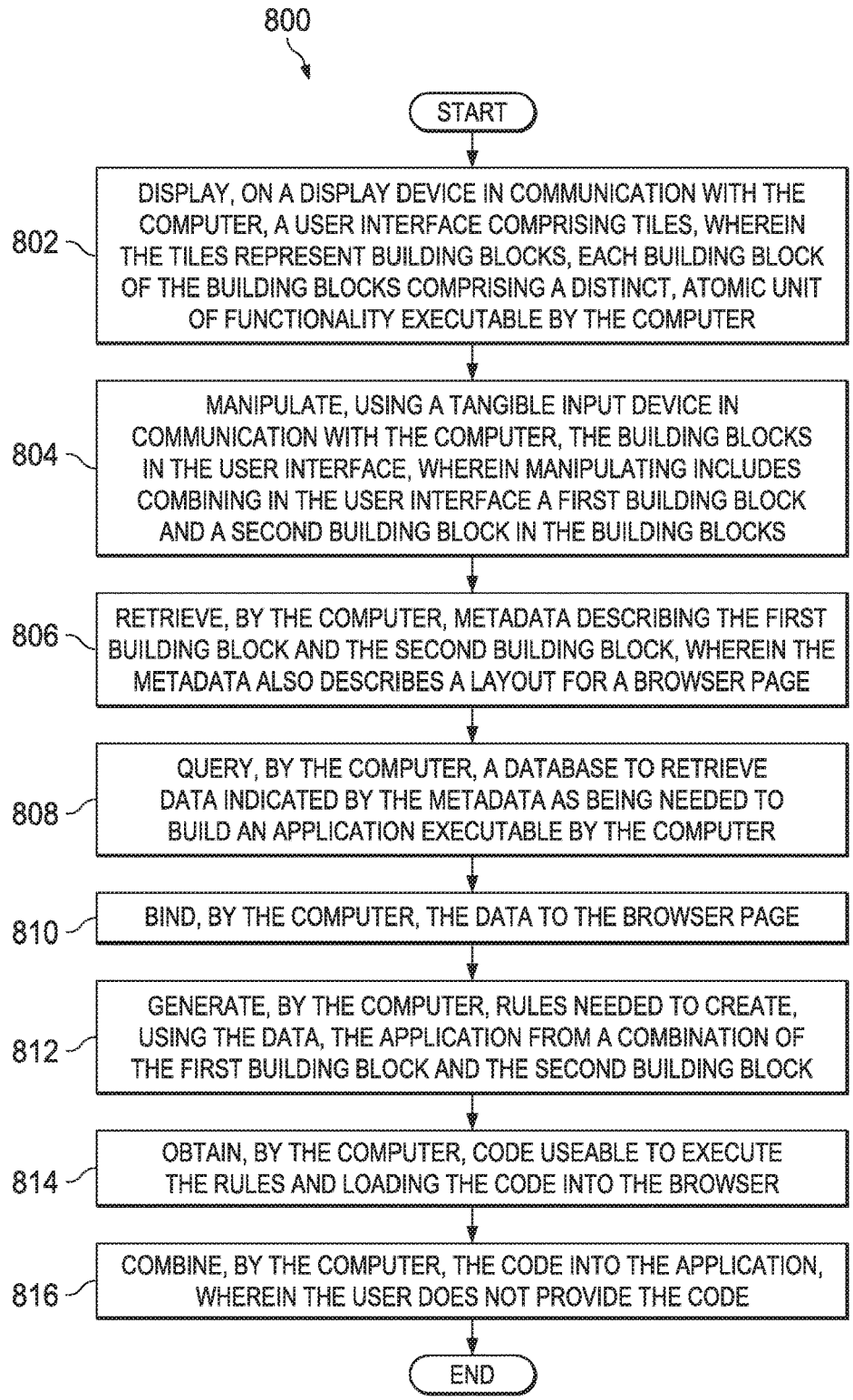
FIG. 8 is a flowchart of a method of transforming a computer by changing a function of the computer without a user providing the computer with computer code, in accordance with an illustrative embodiment.

FIG. 8 is a flowchart of a method of transforming a computer by changing a function of the computer without a user providing the computer with computer code, in accordance with an illustrative embodiment. Method 800 may be implemented using a user interface engine, such as user interface engine 202 of FIG. 2.

Method 800 is a method of transforming a computer by changing a function of the computer without a user providing the computer with computer code. The computer is transformed by operation of method 800 in that the function of the physical machine is changed as a result of method 800 being performed. Thus, the machine itself is changed. Additionally, enabling a user to program the machine without using computer usable program code enhances the physical user interface of the machine, and improves the ability of the user to use the machine. The various operations performed in method 800 may be performed by one or more computers. In an illustrative embodiment, method 800 is performed on a client device, except where specifically noted.

Method 800 may begin by displaying, on a display device in communication with the computer, a user interface comprising tiles, wherein the tiles represent building blocks, each building block of the building blocks comprising a distinct, atomic unit of functionality executable by the computer (operation 802). Method 800 may also include manipulating, using a tangible input device in communication with the computer, the building blocks in the user interface, wherein manipulating includes combining in the user interface a first building block and a second building block in the building blocks (operation 804).

Method 800 may also include retrieving, by the computer, metadata describing the first building block and the second building block, wherein the metadata also describes a layout for a browser page (operation 806). Method 800 may also include querying, by the computer, a database to retrieve data indicated by the metadata as being needed to build an application executable by the computer (operation 808).

Method 800 may also include binding, by the computer, the data to the browser page (operation 810). Method 800 may also include generating, by the computer, rules needed to create, using the data, the application from a combination of the first building block and the second building block (operation 812). Method 800 may also include obtaining, by the computer, code useable to execute the rules and loading the code into the browser (operation 814). Method 800 may also include combining, by the computer, the code into the application, wherein the user does not provide the code (operation 816). The method may terminate thereafter.

Method 800 may be further varied. For example, method 800 may also include displaying the application in the user interface as a new tile. Method 800 may also include adding, by the computer, an adapter to the application, the adapter providing functionality for integrating the application with an external program not built using the computer.

In another illustrative embodiment, method 800 may also include repeating displaying, manipulating, retrieving, querying, binding, generating, obtaining, and combining to form a second application. Additionally, the method may include combining the application and the second application into a collection, the collection comprising a third application having a combined functionality of the application and the second application.

In another illustrative embodiment, method 800 may also include repeating at least twice displaying, manipulating, retrieving, querying, binding, generating, obtaining, and combining to form a second application to form a fourth application and a fifth application. In this case the method may also include combining the fourth application and the fifth application into a second collection comprising a sixth application having a combined functionality of the fourth application and the fifth application. Further, in this case, the method may include combining the third application and the sixth application into a bundle, the bundle comprising a group of collections that function as a single program.

In another illustrative embodiment, method 800 may also include adding, by the computer, an adapter to the third application and the sixth application the adapter providing functionality for integrating the bundle with the second bundle. In another illustrative embodiment, displaying, manipulating, retrieving, querying, binding, generating, obtaining, and combining are performed by a user interface engine executing on the computer. In this case, method 800 may also include storing a state of the user interface engine in a tree structure. Further, method 800 may include storing data queries as virtual pointers to underlying data; and binding the data queries to the user interface engine.

Alternatively, in the above example, method 800 may further include maintaining, by the user interface engine, a dependency graph of input parameters; and inserting additional parameters into the data queries. In this case, the code may be useable to execute the rules is obtained from a remote server. Thus, method 800 may also include the remote server executing a user interface orchestrator that receives requests from the browser; and the remote server passing the code and metadata to the browser such that the user interface engine can combine the first building block and the second building block at the computer.

The illustrative embodiments described with respect to FIG. 8 may be yet further varied. For example, more or fewer operations could be included. Thus, the illustrative embodiments do not necessarily limit the claimed inventions.

Figure 9:
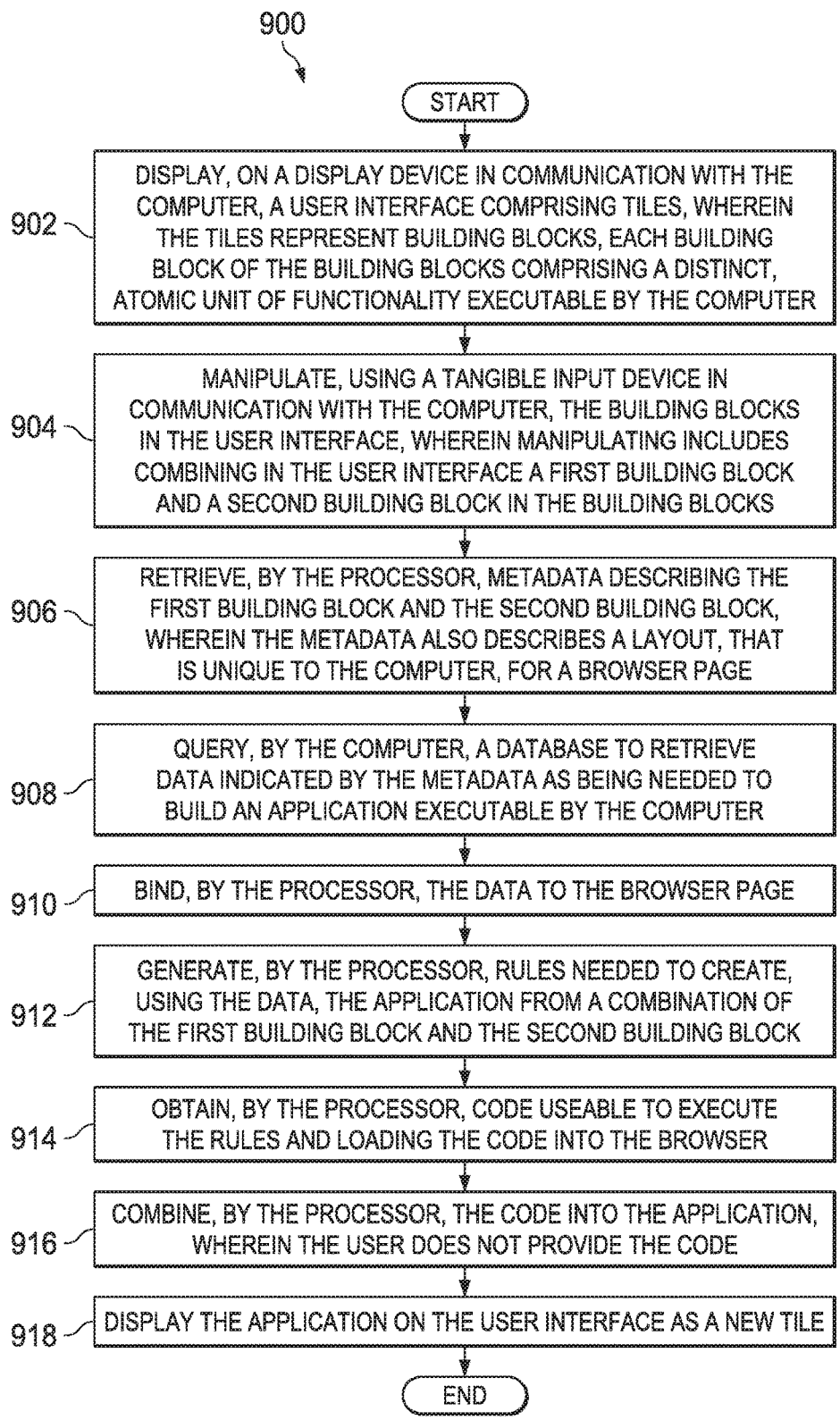
FIG. 9 is a flowchart of a method of transforming a user interface, in accordance with an illustrative embodiment.

FIG. 9 is a flowchart of a method of transforming a user interface, in accordance with an illustrative embodiment. Method 900 may be implemented using a user interface engine, such as user interface engine 202 of FIG. 2.

Method 900 is a method of transforming a user interface. Method 900 is necessarily rooted in computer technology to overcome a problem specifically arising in graphical user interfaces; namely, presenting a graphical user interface to a specific user in a manner which allows the user to build a computer program without the user providing code. Prior user interfaces required the user to present code to the computer in order for the computer to be able to execute the functionality of the desired program. Method 900 recites a specific application of an algorithm that improves the functioning of the basic display function of the computer itself.

Method 900 may include displaying, on a display device in communication with the computer, a user interface comprising tiles, wherein the tiles represent building blocks, each building block of the building blocks comprising a distinct, atomic unit of functionality executable by the computer (operation 902). Method 900 may also include manipulating, using a tangible input device in communication with the computer, the building blocks in the user interface, wherein manipulating includes combining in the user interface a first building block and a second building block in the building blocks (operation 904).

Method 900 may also include retrieving, by the processor, metadata describing the first building block and the second building block, wherein the metadata also describes a layout, that is unique to the computer, for a browser page (operation 906). Method 900 may also include querying, by the processor, a database to retrieve data indicated by the metadata as being needed to build an application executable by the processor (operation 908).

Method 900 may also include binding, by the processor, the data to the browser page (operation 910). Method 900 may also include generating, by the processor, rules needed to create, using the data, the application from a combination of the first building block and the second building block (operation 912).

Method 900 may also include obtaining, by the processor, code useable to execute the rules and loading the code into the browser (operation 914). Method 900 may also include combining, by the processor, the code into the application, wherein the user does not provide the code (operation 916). Method 900 may also include displaying the application on the user interface as a new tile (operation 918).

Method 900 may be further varied. For example, method 900 may also include selecting, using the tangible input device, the application; and responsive to selecting, the processor executing the application. Method 900 may also include adding, by the processor, an adapter to the application, the adapter providing functionality for integrating the application with an external program not built using the computer.

The illustrative embodiments described with respect to FIG. 9 may be yet further varied. For example, more or fewer operations could be included. Thus, the illustrative embodiments do not necessarily limit the claimed inventions.

Figure 10:
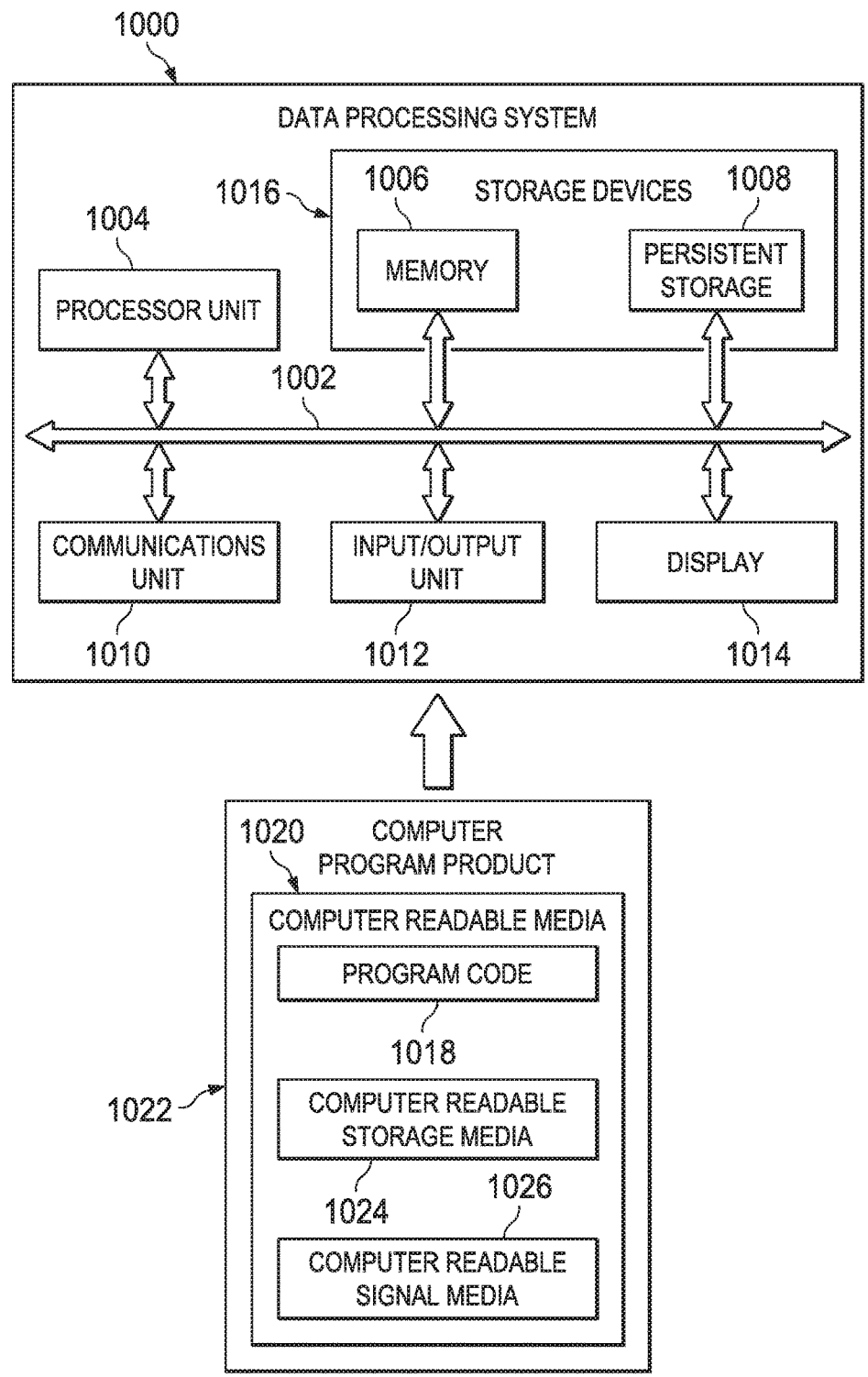
FIG. 10 illustrates a data processing system, in accordance with an illustrative embodiment.

Turning now to FIG. 10, an illustration of a data processing system is depicted in accordance with an illustrative embodiment. Data processing system 1000 in FIG. 10 is an example of a data processing system that may be used to implement the illustrative embodiments, such as the interpolation methods described with respect to FIG. 1 through FIG. 5. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. This software may be an associative memory, content addressable memory, or software for implementing the processes described elsewhere herein. Processor unit 1004 may be a number of processors, a multiprocessor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multiprocessor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

A method of transforming a computer by changing a function of the computer without a user providing the computer with computer code, the method comprising:

displaying, on a display device in communication with the computer, a user interface comprising tiles, wherein the tiles represent building blocks, each building block of the building blocks comprising a distinct, atomic unit of functionality executable by the computer;

manipulating, using a tangible input device in communication with the computer, the building blocks in the user interface, wherein manipulating includes combining in the user interface a first building block and a second building block in the building blocks;

retrieving, by the computer, metadata describing the first building block and the second building block, wherein the metadata also describes a layout for a browser page;

querying, by the computer, a database to retrieve data indicated by the metadata as being needed to build an application executable by the computer;

binding, by the computer, the data to the browser page;

generating, by the computer, rules needed to create, using the data, the application from a combination of the first building block and the second building block;

obtaining, by the computer, code useable to execute the rules and loading the code into the browser; and combining, by the computer, the code into the application, wherein the user does not provide the code.

A method of displaying information on a display device of a computer, the method comprising:

displaying, on a display device in communication with the computer, a user interface comprising tiles, wherein the tiles consist of building blocks, each building block of the building blocks comprising a distinct, atomic unit of functionality executable by the computer to display a user interface on the display device;

manipulating, using a tangible input device in communication with the computer, the building blocks in the user interface, wherein manipulating includes combining in the user interface a first building block and a second building block in the building blocks;

retrieving, by the computer, metadata describing the first building block and the second building block, wherein the metadata also describes a layout for a browser page;

querying, by the computer, a database to retrieve data indicated by the metadata as being needed to build a user interface application executable by the computer;

binding, by the computer, the data to the browser page;

generating, by the computer, rules needed to create, using the data, the application from a combination of the first building block and the second building block;

obtaining, by the computer, code useable to execute the rules and loading the code into the browser;

combining, by the computer, the code into the application to form a user interface to be displayed on the computer, wherein the user does not provide the code; and displaying the user interface on the display device.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of displaying information on a display device of a computer, the method comprising:

displaying, on a display device in communication with the computer, a user interface comprising tiles, wherein the tiles consist of building blocks, each building block of the building blocks comprising a distinct, atomic unit of functionality executable by the computer to display a user interface on the display device;

manipulating, using a tangible input device in communication with the computer, the building blocks in the user interface, wherein manipulating includes combining in the user interface a first building block and a second building block in the building blocks;

retrieving, by the computer, metadata describing the first building block and the second building block, wherein the metadata also describes a layout for a browser page;

querying, by the computer, a database to retrieve data indicated by the metadata as being needed to build a user interface application executable by the computer;

binding, by the computer, the data to the browser page;

generating, by the computer, rules needed to create, using the data, the application from a combination of the first building block and the second building block;

obtaining, by the computer, code useable to execute the rules and loading the code into the browser;

combining, by the computer, the code into the application to form a user interface to be displayed on the computer, wherein the user does not provide the code; and displaying the user interface on the display device.

2. The method of claim 1 further comprising:
displaying the application in the user interface as a new tile.

3. The method of claim 1 further comprising:
adding, by the computer, an adapter to the application, the adapter providing functionality for integrating the application with an external program not built using the computer.

4. The method of claim 1 further comprising:
repeating displaying, manipulating, retrieving, querying, binding, generating, obtaining, and combining to form a second application; and combining the application and the second application into a collection, the collection comprising a third application having a combined functionality of the application and the second application.

5. The method of claim 4 further comprising:
repeating at least twice displaying, manipulating, retrieving, querying, binding, generating, obtaining, and combining to form a second application to form a fourth application and a fifth application;

combining the fourth application and the fifth application into a second collection comprising a sixth application having a combined functionality of the fourth application and the fifth application; and combining the third application and the sixth application into a bundle, the bundle comprising a group of collections that function as a single program.

6. The method of claim 5 further comprising:
adding, by the computer, an adapter to the third application and the sixth application the adapter providing functionality for integrating the bundle with a second bundle.

7. The method of claim 1 wherein displaying, manipulating, retrieving, querying, binding, generating, obtaining, and combining are performed by a user interface engine executing on the computer, and wherein the method further comprises:
storing a state of the user interface engine in a tree structure.

8. The method of claim 7 further comprising:
storing data queries as virtual pointers to underlying data; and
binding the data queries to the user interface engine.

9. The method of claim 7 further comprising:
maintaining, by the user interface engine, a dependency graph of input parameters; and
inserting additional parameters into the data queries.

10. The method of claim 9 wherein the code useable to execute the rules is obtained from a remote server.

11. The method of claim 10 further comprising:
the remote server executing a user interface orchestrator that receives requests from the browser; and
the remote server passing the code and metadata to the browser such that the user interface engine can combine the first building block and the second building block at the computer.

12. A non-transitory computer readable medium storing program code which, when executed by a processor, performs a computer implemented method of displaying information on a display device of a computer, the program code comprising:
program code for displaying, on a display device in communication with the computer, a user interface comprising tiles, wherein the tiles consist of building blocks, each building block of the building blocks comprising a distinct, atomic unit of functionality executable by the computer to display a user interface on the display device;

program code for manipulating, using a tangible input device in communication with the computer, the building blocks in the user interface, wherein manipulating includes combining in the user interface a first building block and a second building block in the building blocks;

program code for retrieving, by the computer, metadata describing the first building block and the second building block, wherein the metadata also describes a layout for a browser page;

program code for querying, by the computer, a database to retrieve data indicated by the metadata as being needed to build a user interface application executable by the computer;

program code for binding, by the computer, the data to the browser page;

program code for generating, by the computer, rules needed to create, using the data, the application from a combination of the first building block and the second building block;

program code for obtaining, by the computer, code useable to execute the rules and loading the code into the browser;

program code for combining, by the computer, the code into the application to form a user interface to be displayed on the computer, wherein the user does not provide the code; and program code for displaying the user interface on the display device.

13. The non-transitory computer readable medium of claim 12 wherein the program code further comprises:
computer usable program code for displaying the application in the user interface as a new tile.

14. The non-transitory computer readable medium of claim 12 wherein the program code further comprises:
computer usable program code for adding, by the computer, an adapter to the application, the adapter providing functionality for integrating the application with an external program not built using the computer.

15. The non-transitory computer readable medium of claim 12 wherein the program code further comprises:
   computer usable program code for repeating displaying, manipulating, retrieving, querying, binding, generating, obtaining, and combining to form a second application; and
   computer usable program code for combining the application and the second application into a collection, the collection comprising a third application having a combined functionality of the application and the second application.

16. The non-transitory computer readable medium of claim 15 wherein the computer usable program code further comprises:
   computer usable program code for repeating at least twice displaying, manipulating, retrieving, querying, binding, generating, obtaining, and combining to form a second application to form a fourth application and a fifth application;
   computer usable program code for combining the fourth application and the fifth application into a second collection comprising a sixth application having a combined functionality of the fourth application and the fifth application; and
   computer usable program code for combining the third application and the sixth application into a bundle, the bundle comprising a group of collections that function as a single program.

17. The non-transitory computer readable medium of claim 16 wherein the computer usable program code further comprises:
   computer usable program code for adding, by the computer, an adapter to the third application and the sixth application the adapter providing functionality for integrating the bundle with a second bundle.

18. A computer comprising:
   a processor; and
   a non-transitory computer recordable storage medium connected to the processor, the non-transitory computer recordable storage medium storing program code, which when executed by the processor, performs a computer-implemented method, the program code comprising:
   program code for displaying, on a display device in communication with the computer, a user interface comprising tiles, wherein the tiles consist of building blocks, each building block of the building blocks comprising a distinct, atomic unit of functionality executable by the computer to display a user interface on the display device;
   program code for manipulating, using a tangible input device in communication with the computer, the building blocks in the user interface, wherein manipulating includes combining in the user interface a first building block and a second building block in the building blocks;
   program code for retrieving, by the computer, metadata describing the first building block and the second building block, wherein the metadata also describes a layout for a browser page;
   program code for querying, by the computer, a database to retrieve data indicated by the metadata as being needed to build a user interface application executable by the computer;
   program code for binding, by the computer, the data to the browser page;
   program code for generating, by the computer, rules needed to create, using the data, the application from a combination of the first building block and the second building block;
   program code for obtaining, by the computer, code useable to execute the rules and loading the code into the browser;
   program code for combining, by the computer, the code into the application to form a user interface to be displayed on the computer, wherein the user does not provide the code; and
   program code for displaying the user interface on the display device.

19. The computer of claim 18 wherein the program code further comprises:
   program code for selecting, using the tangible input device, the application; and
   responsive to selecting, the processor executing the application.

20. The computer of claim 18 wherein the program code further comprises:
   program code for adding, by the processor, an adapter to the application, the adapter providing functionality for integrating the application with an external program not built using the computer.

* * * * *